United States Patent
Cannata

(10) Patent No.: US 10,402,197 B2
(45) Date of Patent: *Sep. 3, 2019

(54) KERNEL THREAD NETWORK STACK BUFFERING

(71) Applicant: Liqid Inc., Broomfield, CO (US)

(72) Inventor: James Scott Cannata, Denver, CO (US)

(73) Assignee: Liqid Inc., Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/166,846

(22) Filed: Oct. 22, 2018

(65) Prior Publication Data
US 2019/0056932 A1 Feb. 21, 2019

Related U.S. Application Data

(63) Continuation of application No. 15/139,596, filed on Apr. 27, 2016, now Pat. No. 10,108,422.
(Continued)

(51) Int. Cl.
| | |
|---|---|
| *G06F 12/14* | (2006.01) |
| *G06F 12/00* | (2006.01) |
| *G06F 9/30* | (2018.01) |
| *G06F 3/06* | (2006.01) |
| *G06F 13/24* | (2006.01) |
| *G06F 9/52* | (2006.01) |
| *G06F 9/46* | (2006.01) |

(52) U.S. Cl.
CPC ............ *G06F 9/3009* (2013.01); *G06F 3/061* (2013.01); *G06F 3/067* (2013.01); *G06F 3/0644* (2013.01); *G06F 3/0656* (2013.01); *G06F 9/46* (2013.01); *G06F 9/526* (2013.01); *G06F 13/24* (2013.01)

(58) Field of Classification Search
None
See application file for complete search history.

(56) References Cited

U.S. PATENT DOCUMENTS

| | | |
|---|---|---|
| 5,828,207 A | 10/1998 | Saadeh |
| 6,061,750 A | 5/2000 | Beardsley et al. |

(Continued)

OTHER PUBLICATIONS

Aragon, Juan L. et al., "Control Speculation for Energy-Efficient Next-Generation Superscalar Processors," IEEE Transactions on Computers, vol. 55, No. 3, pp. 281-291, Mar. 2006.
(Continued)

*Primary Examiner* — Michael Sun

(57) ABSTRACT

Systems, methods, apparatuses, and software for data systems are provided herein. In one example, a data system is presented. The system includes a processing system configured to execute an operating system that comprises a network module for handling data frames directed to a plurality of kernel threads and received over one or more network interfaces of the data system. The network module is configured to establish a plurality of data buffers individually associated with the kernel threads, store associated ones of the data frames for the kernel threads in the data buffers as the data frames are processed through a network stack of the data system, and maintain data exclusivity locks for the plurality of data buffers and individually associate the data exclusivity locks with the kernel threads.

20 Claims, 4 Drawing Sheets

Related U.S. Application Data

(60) Provisional application No. 62/153,582, filed on Apr. 28, 2015.

(56) References Cited

U.S. PATENT DOCUMENTS

| | | | |
|---|---|---|---|
| 6,325,636 | B1 | 12/2001 | Hipp et al. |
| 7,089,555 | B2 * | 8/2006 | Calvignac ............... G06F 9/526 710/200 |
| 7,243,145 | B1 | 7/2007 | Poortman |
| 7,260,487 | B2 | 8/2007 | Brey et al. |
| 7,290,105 | B1 * | 10/2007 | Jeter, Jr. ................. G06F 9/526 711/150 |
| 7,505,889 | B2 | 3/2009 | Salmonsen et al. |
| 7,606,960 | B2 | 10/2009 | Munguia |
| 7,725,757 | B2 | 5/2010 | Padweka et al. |
| 7,877,542 | B2 | 1/2011 | Chow et al. |
| 8,125,919 | B1 | 2/2012 | Khanka et al. |
| 8,150,800 | B2 | 4/2012 | Webman et al. |
| 8,363,059 | B2 | 1/2013 | Naoi |
| 8,656,117 | B1 | 2/2014 | Wong et al. |
| 8,688,926 | B2 | 4/2014 | Breakstone et al. |
| 8,880,771 | B2 | 11/2014 | Subramaniyan et al. |
| 9,602,437 | B1 | 3/2017 | Bernath |
| 2002/0059428 | A1 | 5/2002 | Susai et al. |
| 2002/0061012 | A1 | 5/2002 | Thi et al. |
| 2003/0110423 | A1 | 6/2003 | Helms et al. |
| 2003/0126478 | A1 | 7/2003 | Burns et al. |
| 2005/0223136 | A1 | 10/2005 | Tanaka et al. |
| 2005/0234989 | A1 * | 10/2005 | Bailey ................. G06F 16/2343 |
| 2005/0282637 | A1 | 12/2005 | Gatto et al. |
| 2006/0277206 | A1 | 12/2006 | Bailey et al. |
| 2007/0067432 | A1 | 3/2007 | Tarui et al. |
| 2008/0034153 | A1 | 2/2008 | Lee et al. |
| 2008/0198744 | A1 | 8/2008 | Menth |
| 2008/0281938 | A1 | 11/2008 | Rai et al. |
| 2008/0310309 | A1 * | 12/2008 | Batalden ............... H04L 49/901 370/236 |
| 2009/0006837 | A1 | 1/2009 | Rothman et al. |
| 2009/0100280 | A1 | 4/2009 | Lindsay |
| 2009/0190427 | A1 | 7/2009 | Brittain et al. |
| 2009/0193201 | A1 | 7/2009 | Brittain et al. |
| 2009/0193203 | A1 | 7/2009 | Brittain et al. |
| 2009/0276551 | A1 | 11/2009 | Brown et al. |
| 2010/0088467 | A1 | 4/2010 | Lee et al. |
| 2011/0161639 | A1 * | 6/2011 | Knauth ................. G06F 9/3863 712/228 |
| 2011/0289510 | A1 | 11/2011 | Lin et al. |
| 2011/0299317 | A1 | 12/2011 | Shaeffer et al. |
| 2011/0320861 | A1 | 12/2011 | Bayer et al. |
| 2012/0030544 | A1 | 2/2012 | Fisher-Jeffes |
| 2012/0089854 | A1 | 4/2012 | Breakstone et al. |
| 2012/0151118 | A1 | 6/2012 | Flynn et al. |
| 2012/0159428 | A1 * | 6/2012 | Park .......................... G06F 8/36 717/104 |
| 2012/0166699 | A1 | 6/2012 | Kumar et al. |
| 2012/0210163 | A1 | 8/2012 | Cho |
| 2012/0227045 | A1 * | 9/2012 | Knauth ................. G06F 9/3863 718/100 |
| 2012/0317433 | A1 | 12/2012 | Ellis et al. |
| 2013/0132643 | A1 | 5/2013 | Huang |
| 2013/0185416 | A1 | 7/2013 | Larkin et al. |
| 2014/0047166 | A1 | 2/2014 | Asnaashari et al. |
| 2014/0056319 | A1 | 2/2014 | Hellwig |
| 2014/0059265 | A1 | 2/2014 | Iyer et al. |
| 2014/0075235 | A1 | 3/2014 | Chandhoke et al. |
| 2014/0103955 | A1 | 4/2014 | Avritch et al. |
| 2014/0108846 | A1 | 4/2014 | Berke et al. |
| 2014/0359232 | A1 | 12/2014 | Holbrook et al. |
| 2014/0365714 | A1 | 12/2014 | Sweere et al. |
| 2015/0074322 | A1 | 3/2015 | Galles |
| 2015/0082319 | A1 * | 3/2015 | Liu ....................... G06F 9/3851 718/107 |
| 2015/0121115 | A1 | 4/2015 | Chandra et al. |
| 2015/0186437 | A1 | 7/2015 | Molaro |
| 2015/0212755 | A1 | 7/2015 | Asnaashari |
| 2015/0304423 | A1 | 10/2015 | Satoyama et al. |
| 2015/0373115 | A1 | 12/2015 | Breakstone et al. |
| 2016/0197996 | A1 | 7/2016 | Barton et al. |
| 2016/0248631 | A1 | 8/2016 | Duchesneau |
| 2016/0321012 | A1 * | 11/2016 | Clark .................... G06F 3/0659 |
| 2016/0378545 | A1 * | 12/2016 | Ho ........................... G06F 9/50 718/107 |
| 2018/0075080 | A1 * | 3/2018 | Hanai .................... G06F 12/00 |

OTHER PUBLICATIONS

International Application No. PCT/US2017/046602, International Search Report & Written Opinion, 8 pages, dated Oct. 19, 2017.
International Application No. PCT/US2017/046607, International Search Report & Written Opinion, 7 pages, dated Oct. 23, 2017.
Lu, Yingping et al., "Performance Study of iSCSI-Based Storage Subsystems," IEEE Communications Magazine, pp. 76-82, Aug. 2003.

* cited by examiner

KERNEL THREAD NETWORK STACK BUFFERING

RELATED APPLICATIONS

This application is a continuation of, and claims priority to, U.S. patent application Ser. No. 15/139,596, titled "MULTI-THREAD NETWORK STACK BUFFERING OF DATA FRAMES," filed Apr. 27, 2016. This application also hereby claims the benefit of priority to U.S. Provisional Patent Application 62/153,582, titled "MULTI-THREADED NETWORK STACK BUFFERING OF STORAGE FRAMES," filed Apr. 28, 2015, which is hereby incorporated by reference in its entirety.

BACKGROUND

Computing and data server systems can include networked storage systems which can service large amounts of network traffic from local and distributed network sites. In these computer systems, a host system, such as a network device, server, or end-user computing device, communicates over one or more network links with bulk storage systems to store data or to access previously stored data. Networked computer systems typically include network interface equipment, such as network interface cards, which provide physical access to one or more packet or frame-based networks, such as Ethernet. This interface equipment can be controlled by software, such as operating systems, drivers, and the like, to handle the various network traffic that traverses the network interfaces and an associated network stack. Operating systems can saturate in traffic handling ability over these network interfaces as network traffic volumes increase in modern server and networked storage systems. These shortcomings can be especially pronounced with the increasing data storage and retrieval needs in networked, cloud, and enterprise environments.

Overview

Systems, methods, apparatuses, and software for data systems are provided herein. In one example, a data system is presented. The system includes a processing system configured to execute an operating system that comprises a network module for handling data frames directed to a plurality of kernel threads and received over one or more network interfaces of the data system. The network module is configured to establish a plurality of data buffers individually associated with the kernel threads, store associated ones of the data frames for the kernel threads in the data buffers as the data frames are processed through a network stack of the data system, and maintain data exclusivity locks for the plurality of data buffers and individually associate the data exclusivity locks with the kernel threads.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
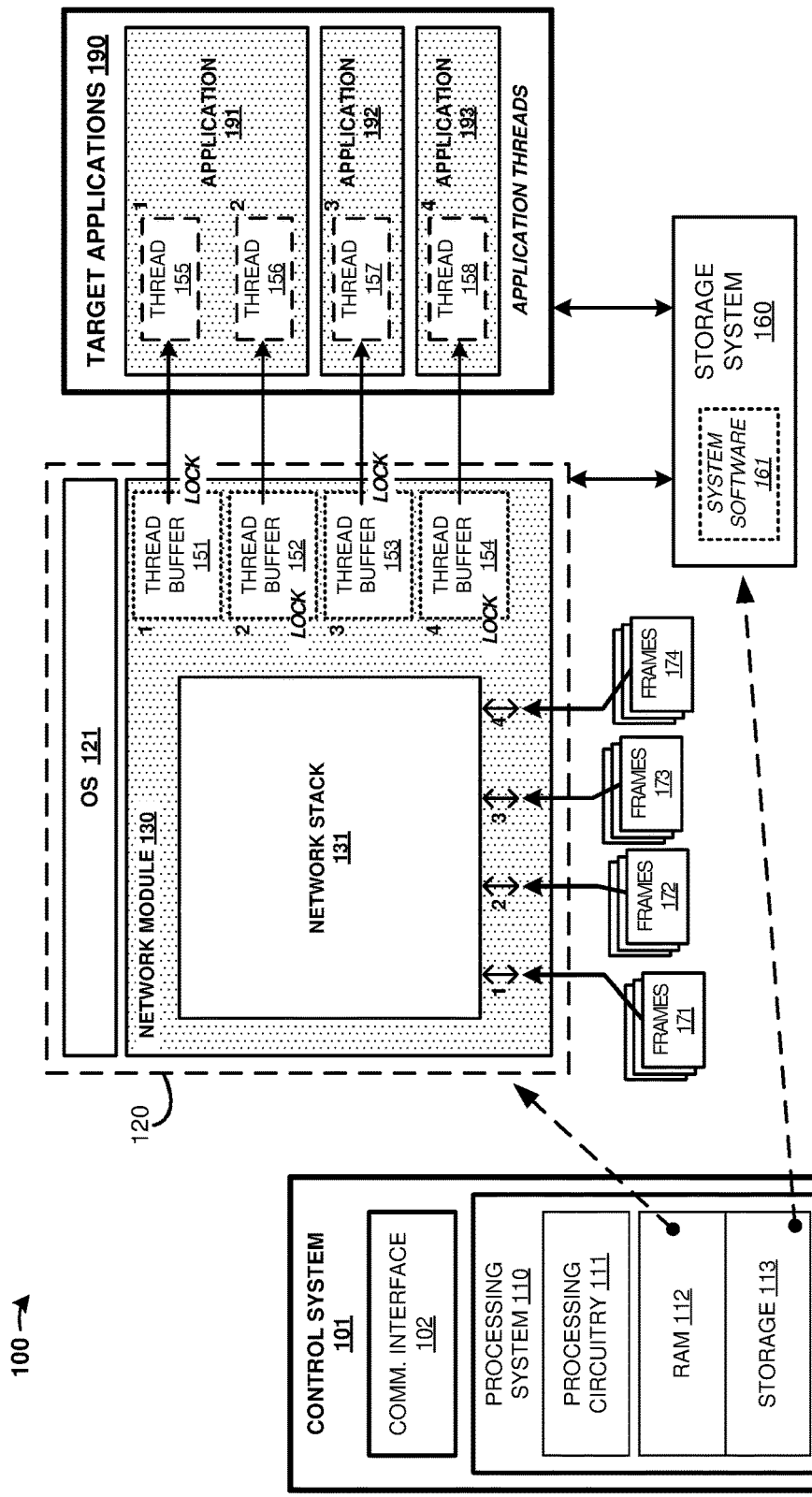
FIG. 1 is a system diagram illustrating a data system.

Networked computer systems typically include network interface equipment, such as network interface cards (NICs) or other network transceiver equipment, which provide physical access to one or more packet or frame-based networks, such as Ethernet. This interface equipment can be controlled by software elements, such as operating systems, drivers, and the like, to handle the various network traffic that traverses the network interfaces and an associated network stack. Packet or frame buffers are typically shared by many consumers that include processes, threads, or applications, and provide resource locking mechanisms to ensure data integrity for the many consumers. Operating systems can saturate in traffic handling ability over these network interfaces as network traffic volumes increase in modern server and networked storage systems. This can be especially pronounced with operating systems rely upon global or shared frame or packet buffers.

In the examples herein, storage transactions or storage operations for the data storage devices can be received over network interfaces for storage of associated data into the data storage devices. These storage operations are encapsulated into one or more frames or packets, depending upon the protocols employed, and can be transferred over network links, routers, and other network equipment between the end user systems and the data storage systems.

In examples where Ethernet is employed over a network link, various Ethernet frames carry the storage operations including any associated data. These frames can be received over a network link and into a network interface of a storage system and passed through several layers of processing by a network stack, such as in an OSI 7-layer protocol model that includes the Application, Presentation, Session, Transport, Network, Data link, and Physical layers.

In typical network systems, such as a network stack or network driver provided in an operating system executed by a processor, a single global buffer pool is employed to handle transferring and processing of the network frames or packets between the various layers of the network stack and also for use by the application thread that is associated with the storage operations, such as a data storage application. For example, in certain Linux operating systems, a "sk_buff" data structure is employed in this manner, while in BSD-based operating systems, an "mbuf" is employed.

When multi-threaded processes or applications are employed on the processor or processing system, then each thread can be handling different storage operations concurrently. However, since a single global buffer is typically employed, then a resource locking mechanism is employed to synchronize access to the global buffer list(s) and ensure data integrity and no overlapping handling of the same data buffer by multiple threads. For example, if a first layer of the network stack wishes to process a frame received into the global buffer, then that first layer will establish a resource lock for the global buffer which prevents other processes or layers from using the global buffer at that time. Once the first layer has finished processing the frame, then the resource lock can be released which can allow other layers or processes to then establish exclusivity for any processing associated with that other layer or process. In this manner, a data frame can be handed off for processing between the various layers of a network stack using the global buffer as a common data exchange location. Likewise, if the data frames are associated with a storage operation, then a storage application can use the global buffer to transfer the data into a storage device once the data frames have progressed up the network stack accordingly.

However, when high-volumes of data traffic are employed with multi-threaded applications, then bottlenecks can occur when using the global buffer with the single resource lock. Furthermore, in certain interfacing environments, such as Peripheral Component Interconnect Express (PCIe) interfaces, signaling between processes can be achieved using message signal interrupts (MSI), or enhanced MSI (MSI-X) which can establish interrupts on a per-thread basis in a processing system. MSI-X has an expanded number of interrupts and tailored to PCIe environments relative to MSI in PCI environments. Thus, multiple storage frames for multiple threads can be received into a network interface and each thread can receive concurrent interrupt signaling. The MSI process uses in-band signaling for interrupt signaling instead of out-of-band signaling. Out-of-band signaling includes dedicated pins or wires which can be toggled to indicate an interrupt condition, whereas in-band signaling uses the same pathways as the data itself to signal interrupts using specialized messaging. As mentioned above, the global buffer can present bottlenecks in high-volume environments. Additionally, when MSI-X is employed, then the various threads of an application can also increase the volume and associated bottlenecks when using the global buffer across the various threads.

Ethernet drivers, such as those employed for 10 Gbps or 40 Gbps links, can use the MSI-X mechanism that allow for multiple interrupt thread contexts that execute in parallel when servicing storage operations (I/Os). The Ethernet driver typically has a unique kernel thread context for each MSI-X vector, but all kernel threads share the same buffer pool, as described above. In the examples below, an enhanced network platform comprising an Ethernet driver is presented which associates each MSI-X thread context with a unique receive buffer list, receive buffer list resource lock, and other kernel resources used to receive and handle Ethernet frames. As mentioned above, traditional kernels have a single network receive buffer list used by all network drivers and each driver's MSI-X thread context (i.e. mbufs in FreeBSD and sk_buffs in Linux). In the examples below, a unique network buffer list per MSI-X thread context is established with modified kernel network buffer routines that allocate and free network buffers to take/append each buffer to the appropriate list.

These enhancements remove contention of the single buffer list lock and single buffer list being used by multiple thread contexts in traditional buffer designs. Thus, for each driver and each MSI-X for each driver, many threads—such as 4 or 8 different thread contexts—would no longer contend for the same buffer list and buffer list lock. This can lead to more parallelism and throughput potential, rather than having multiple thread contexts waiting to access a single buffer list for each received frame.

As a first example of this enhanced buffer structure, FIG. 1 is presented. FIG. 1 is a system diagram illustrating a data system. Data system 100 includes control system 101 which executes networked data platform 120. Data system 100 also include target applications 190 which include one or more applications 191-193 that consume data transferred over network interfaces associated with control system 101. Applications 190 can be included in data platform 120 in some examples. Data platform 120 includes operating system (OS) 121 which comprises a Linux, BSD, Windows, OSX, or other operating system, including combinations and variations thereof. OS 121 can include a kernel portion with one or more network drivers are included to handle network traffic. Network module 130 is included to show network stack 131 and thread buffers 151-154 that have various enhancements to provide for individualized buffers for threads executed by applications 190.

FIG. 1 also includes a block diagram illustrating control system 101. Control system 101 illustrates an example of any of processor, processing module, or control system discussed herein, such as processing system 310 of FIG. 3 or processing system 431 or FIG. 4. Control system 101 includes communication interface 102 and processing system 110. Processing system 110 includes processing circuitry 111, random access memory (RAM) 112, and storage 113, although further elements can be included. Example contents of RAM 112 or storage system 160 are further detailed in data platform 120.

Processing circuitry 111 can be implemented within a single processing device but can also be distributed across multiple processing devices or sub-systems that cooperate in executing program instructions. Examples of processing circuitry 111 include general purpose central processing units, microprocessors, application specific processors, and logic devices, as well as any other type of processing device. In some examples, processing circuitry 111 includes physically distributed processing devices, such as cloud computing systems.

Communication interface 102 includes one or more communication and network interfaces for communicating over communication links, networks, such as packet networks, the Internet, and the like. The communication interfaces can include PCIe links, serial links, such as SPI links, I2C links, USB links, UART links, or one or more local or wide area network communication interfaces which can communicate over Ethernet or Internet protocol (IP) links. Communication interface 102 can include network interfaces configured to communicate using one or more network addresses, which can be associated with different network links. Examples of communication interface 102 include network interface card equipment, transceivers, modems, and other communication circuitry.

RAM 112 and storage 113 together can comprise a non-transitory data storage system, although variations are possible. RAM 112 and storage 113 can each comprise any storage media readable by processing circuitry 111 and capable of storing software. RAM 112 can include volatile and nonvolatile, removable and non-removable media implemented in any method or technology for storage of information, such as computer readable instructions, data structures, program modules, or other data. Storage 113 can include non-volatile storage media, such as solid state storage media, flash memory, phase change memory, or magnetic memory, including combinations thereof. RAM 112 and storage 113 can each be implemented as a single storage device but can also be implemented across multiple storage devices or sub-systems. RAM 112 and storage 113 can each comprise additional elements, such as controllers, capable of communicating with processing circuitry 111.

Software stored on or in RAM 112 or storage 113 can comprise computer program instructions, firmware, or some other form of machine-readable processing instructions having processes that when executed a processing system direct control system 101 to operate as described herein. For example, software can drive control system 101 to handle data frames directed to one or more applications received over one or more network interfaces, establish a plurality of data buffers individually associated with application threads of the one or more applications, store associated ones of the data frames for the application threads in the data buffers as the data frames are processed through a network stack of the networked data processing system, and maintain data exclusivity locks for the plurality of data buffers and individually associate the data exclusivity locks with the application threads, or associating a unique buffer list with each dedicated MSI/MSI-X thread, among other operations. The software can also include user software applications. The software can be implemented as a single application or as multiple applications. In general, the software can, when loaded into a processing system and executed, transform the processing system from a general-purpose device into a special-purpose device customized as described herein.

Data platform 120 illustrates a detailed view of an example configuration stored in RAM 112. It should be understood that different configurations are possible. Data platform 120 includes operating system (OS) 121, network module 130, and applications 190. Software applications 191-193 each comprise executable instructions which can be executed by control system 101, or other processing systems, for operating according to the operations discussed herein. In operation, data platform 120 can handle data frames directed to one or more applications received over one or more network interfaces, establish a plurality of data buffers individually associated with application threads of the one or more applications, store associated ones of the data frames for the application threads in the data buffers as the data frames are processed through a network stack of the networked data processing system, and maintain data exclusivity locks for the plurality of data buffers and individually associate the data exclusivity locks with the application threads, or associate a unique buffer list with each dedicated MSI/MSI-X thread, among other operations discussed herein.

OS 121, network module 130, and applications 190 can reside in RAM 112 during execution and operation of control system 101, and can reside in storage system 160 during a powered-off state, among other locations and states. OS 121, network module 130, and applications 190 can be loaded into RAM 112 during a startup or boot procedure as described for computer operating systems and applications.

Storage system 160 illustrates a detailed view of an example configuration of storage 113. Storage system 160 can comprise flash memory such as NAND flash or NOR flash memory, phase change memory, magnetic memory, among other solid state storage technologies. As shown in FIG. 1, storage system 160 includes system software 161. As described above, system software 161 can be in a non-volatile storage space for OS 121, network module 130, and applications 190 during a powered-down state of control system 101, among other operating software.

Control system 101 is generally intended to represent a computing system with which at least software 161, OS 121, network module 130, and applications 190 are deployed and executed in order to render or otherwise implement the operations described herein. However, control system 101 can also represent any computing system on which at least software 161, OS 121, network module 130, and applications 190 can be staged and from where software 161, OS 121, network module 130, and applications 190 can be distributed, transported, downloaded, or otherwise provided to yet another computing system for deployment and execution, or yet additional distribution.

Figure 2:
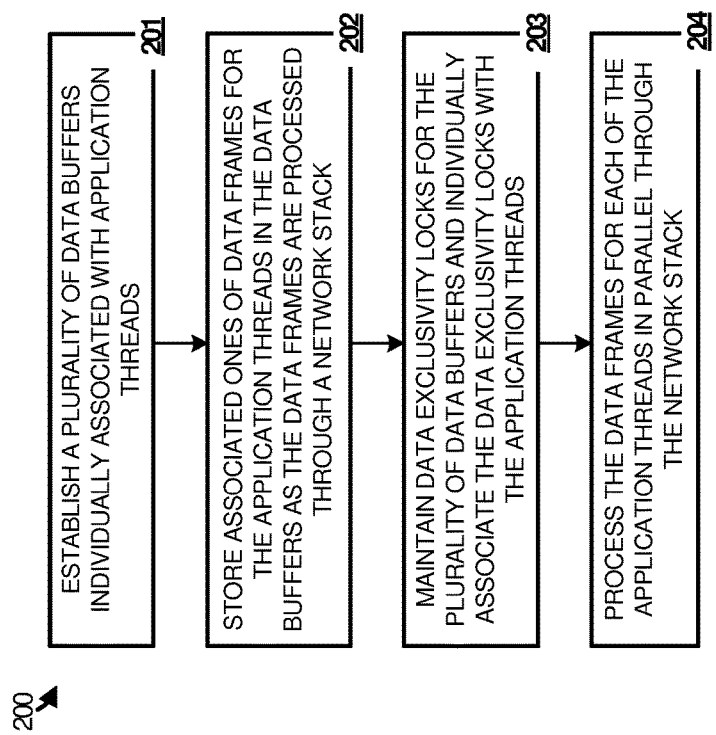
FIG. 2 is a flow diagram illustrating method of operating a data system.

To illustrate example operation of the elements of FIG. 1, a flow diagram is presented in FIG. 2. The operations of FIG. 2 are included parenthetically below. In operation, control system 101 receives a plurality of network traffic over one or more network interfaces. This network traffic can be transported over an Ethernet network, among other network, network types, or network links. The network traffic carries one or more data operations for handling by control system 101 and applications 190. These data operations can include storage operations which can retrieve or store data on associated storage drives.

Control system 101 establishes (201) a plurality of data buffers individually associated with application threads. In FIG. 1, one or more sets of Ethernet frames 171-174 are received by control system 101, such as over communication interfaces 102. In this example, frames 171 are associated with a first thread context, frames 172 are associated with a second thread context, frames 173 are associated with a third thread context, and frames 174 are associated with a fourth thread context, thus a current context quantity of 4 is established. Each context is associated with a separate application thread of applications 191-193, namely ones of 155-158.

Control system 101 stores (202) associated ones of data frames for the application threads in the data buffers as the data frames are processed through a network stack. Network module 130 includes thread-specific buffers 151-154. These buffers are included in network module 130 instead of globally in a kernel or OS in this example, although they could instead be included in other software portions. Each buffer 151-154 comprises one or more data structures which can have a resource lock established independently of the other buffers. Thus, when operating in a multi-threaded environment as shown, such as a thread context number of 4, then four separate streams of frames 171-174 can be received simultaneously into an associated thread buffer 151-154. Four independent contexts are shown in network module 130, namely 1-4, which can handle network stack processing for each associated thread 155-158. As the frames/packets are processed by each layer of network module 130, then each can have an associated resource lock established independently on a per-context basis.

Control system 101 maintains (203) data exclusivity locks for the plurality of data buffers and individually associates the data exclusivity locks with the application threads, and processes (204) the data frames for each of the application threads in parallel through the network stack. In some examples, control system 101 maintains data exclusivity locks for the plurality of data buffers and individually associates a unique buffer list with a dedicated MSI/MSI-X thread, such as discussed in FIG. 3. While a first thread context associated with thread 155 is operating presently at a first layer of network stack 131 and has a resource lock on thread buffer 151, other concurrent thread/stack operations can occur for each of threads 156-158. These concurrent thread/stack operations can include a second operation associated with thread 156 having a resource lock on thread buffer 152, a third network stack operation associated with thread 157 having a resource lock on thread buffer 153, and a fourth network stack operation associated with thread 158 having a resource lock on thread buffer 154. Advantageously, all four contexts of target applications 190 can be operating through network stack 131 on separate data structures established in thread buffers 151-154 simultaneously. The resource lock is established on a per-buffer basis and allows multiple threads to not have to wait for a global resource lock among each other. Associated frame payloads can be handled concurrently in by applications 191-193 once network stack processing has completed for each thread.

Figure 3:
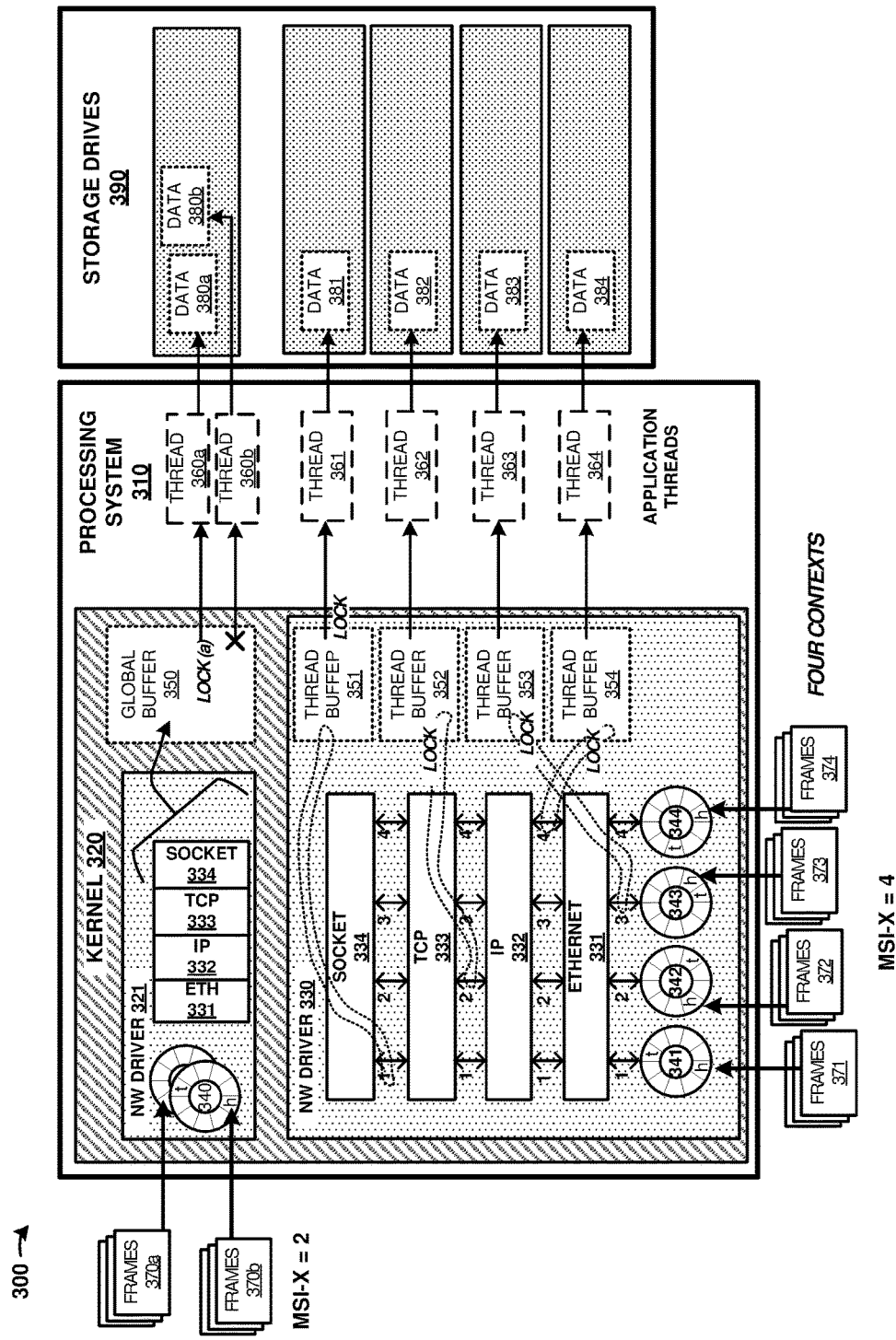
FIG. 3 is a system diagram illustrating a data system.

As a further example of an enhanced buffer structure, FIG. 3 is presented. FIG. 3 is a system diagram illustrating a storage system. Storage system 300 includes processing system 310 and storage drives 390. Processing system 310 can be included in a processing module or processing node, such as processing module 430 in FIG. 4 below, although variations are possible. Storage drives 390 each include one or more data storage drives, such as solid state storage drives (SSDs) or hard disk drives, among other data storage devices. Storage drives 390 can be coupled to processing system 310 over one or more storage interfaces, such as the PCIe fabric discussed below, among other storage interfaces such as NVMe, Serial Attached SCSI (SAS), FibreChannel, Thunderbolt, or Serial Attached ATA Express (SATA Express).

In operation, processing system 310 receives a plurality of network traffic over one or more network interfaces. This network traffic can be transported over an Ethernet network, among other network, network types, or network links. The network traffic carries one or more storage operations for handling by processing system 310. These storage operations can include read operations or write operations which can retrieve or store data on any of storage drives 390.

Processing system 310 includes kernel 320 which comprises a kernel portion of an operating system executed by processing system 310, such as a Linux, BSD, Windows, OSX, or other operating system, including combinations and variations thereof. Within kernel 320 one or more network drivers are included to handle network traffic for kernel 320. A first network driver 321 is included to show a shared global buffer, while a second network driver 330 is shown as having various enhancements that provide for individualized buffers for threads executed by processing system 310.

Turning first to network driver 321, one or more sets of Ethernet frames 370a-370b are received into ring buffers 340 of network driver 321. In this example, frames 370a are associated with a first MSI-X context while frames 370b are associated with a second MSI-X context, thus a current MSI-X of 2 is established. Each MSI-X context is associated with a separate thread, 360a and 360b.

Network driver 321 handles frames through the associated network stack and associated network layers 331-334. A global buffer 350 is used to handle transfer of control information and the frames between the various layers as well as by the associated thread before transfer to the appropriate storage drive. However, in kernel 320 a single data structure is employed with a single resource lock for frames received into network driver 321. If a first layer of the network stack, such as IP 332 is currently processing a portion of the packet or frame it must do so by first locking an associated resource in global buffer 350. Other layers of the network stack and other MSI-X contexts must wait until the resource lock has been relinquished by IP 332 before those other layers can operate on data in global buffer 350. Likewise, at the application layer, such as in thread 360a, a resource lock is placed on data in global buffer 350 and concurrent thread 360b must wait until this resource lock is released before operating on data in global buffer 350. In this manner, if more than one thread or MSI-X context is employed by kernel 320 for network driver 321 then a sequential or lock-release process must occur among the various threads/MSI-X contexts. This can lead to slowdowns and bottlenecks in frame/packet processing when many threads are employed.

Turning now to the enhanced operation, namely for network driver 330, several thread-specific buffers 351-354 are employed. These buffers are included in network driver 330 instead of globally in kernel 320 in this example, although they could instead be included in other software portions of kernel 320. Each buffer 351-354 comprises one or more data structures which can have a resource lock established independently of each other buffer.

Thus, when operating in a multi-threaded environment as shown, such as a MSI-X context number of 4, then four separate streams of frames 371-374 can be received simultaneously into an associated ring buffer 341-344 before entry into the individual thread buffer 351-354. Four independent contexts are shown in network driver 330, namely 1-4, which can handle network stack processing for each associated thread 361-364. As the frames/packets are processed by each layer of network driver 330, then each can have an associated resource lock established independently on a per-context basis.

Thus, while a first context associated with thread 361 is operating presently at socket layer 334 and has a resource lock on thread buffer 351, other concurrent thread/stack operations can occur. These concurrent thread/stack operations can include a TCP 333 operation associated with thread 362 having a resource lock on thread buffer 352, an Ethernet 331 operation associated with thread 363 having a resource lock on thread buffer 353, and an IP 332 operation associated with thread 364 having a resource lock on thread buffer 354. Advantageously, all four contexts of the MSI-X=4 setting can be operating on separate data structures established in thread buffers 351-354 simultaneously. The resource lock is established on a per-buffer basis and allows multiple threads to not have to wait for a global resource lock among each other as in network driver 321. Associated data 381-384 can be stored concurrently in storage drives 390 once network stack processing has completed for each thread.

The global buffer regime as discussed in network driver 321 and buffer 350 can be established concurrently with the enhanced network driver 330 to allow for enhanced and legacy network stack operations. More than one network interface might be employed, and a first network interface can handle high-volume storage transactions using the multi-buffer approach in network driver 330, while a second network interface can handle low-volume traffic (such as control traffic or sideband communications) using the global buffer approach. Various flags can be included in the frames themselves (such as a bit in a header) or in the network driver source code which can indicate which pathway should be used for a particular frame or driver instance.

Figure 4:
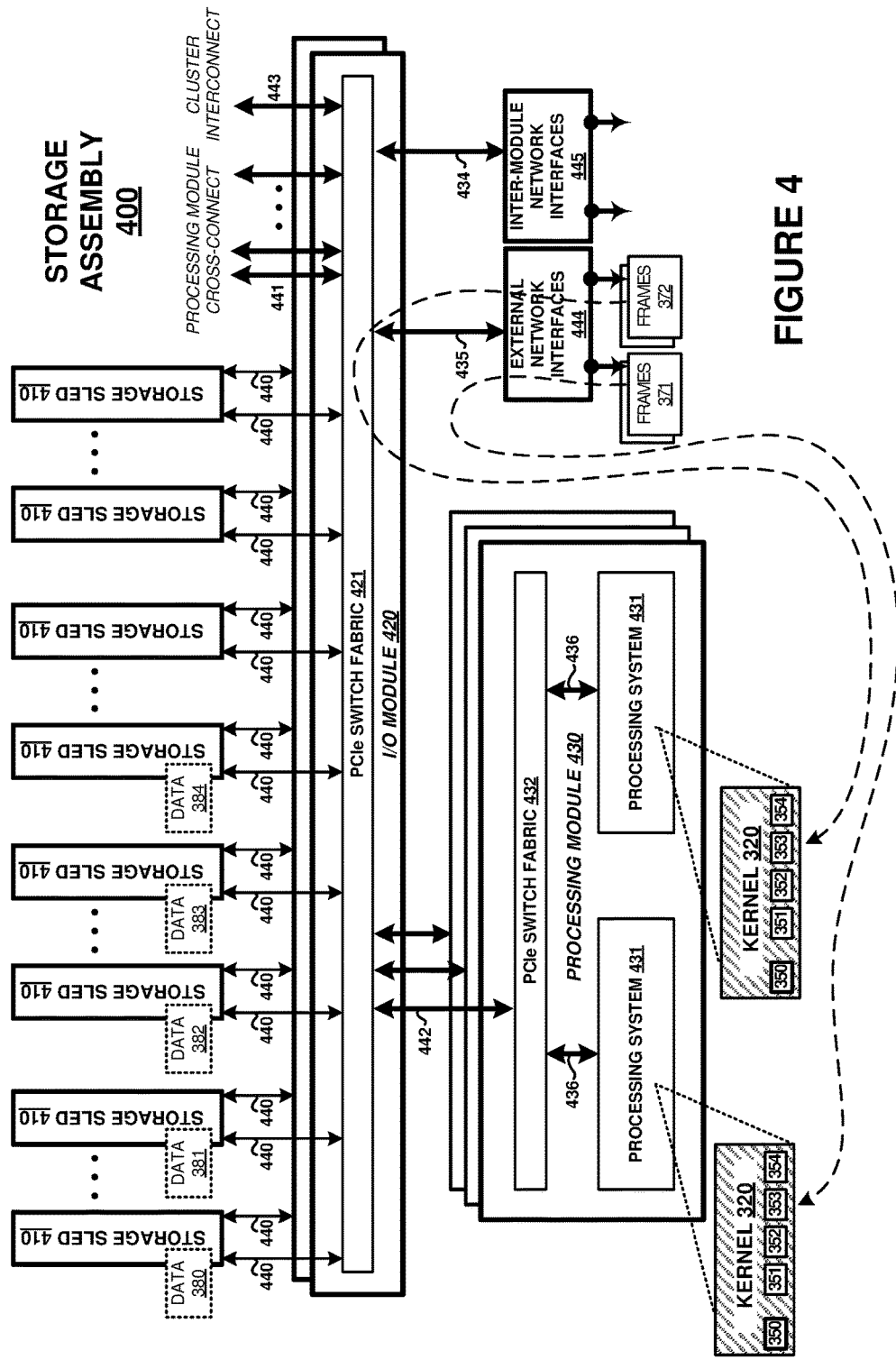
FIG. 4 is a system diagram illustrating a storage assembly.

As a further example of the enhanced buffering of network frames/packets discussed above, FIG. 4 is presented. FIG. 4 includes further storage system elements along with example inclusions of some of the elements of FIGS. 1 and 3. It should be understood that other elements from FIGS. 1 and 3 could be included and that FIG. 4 can instead include variations on the elements of FIGS. 1 and 3.

FIG. 4 is a system diagram illustrating storage assembly 400. Storage assembly 400 includes three different module types in FIG. 4, namely storage sleds 410, input/output (I/O) modules 420, and processing modules 430. In this example, 48 storage sleds, 2 I/O modules, and 3 processing modules are included. However, it should be understood that any number of storage sleds 410, I/O modules 420, and processing modules 430 can be included. Additionally, power supply modules and associated power and control distribution links can also be included, but are omitted in FIG. 4 for clarity.

A module typically comprises physical support structure and enclosure that includes circuitry, printed circuit boards, semiconductor systems, and structural elements. The modules are insertable and removable from a rackmount style of enclosure. In some examples, the elements of FIG. 4 are included in a unit chassis for mounting in a larger rackmount environment. It should be understood that the elements of FIG. 4 can be included in any physical mounting environment, and need not include any associated enclosures or rackmount elements.

A plurality of storage sleds 410 are included in system 400. Each storage sled 410 includes one or more storage drives, such as four in some examples. Each storage sled 410 also includes Peripheral Component Interconnect Express (PCIe) switches, processors, and control system elements. PCIe switches of each storage sled 410 communicate with one or more on-sled storage drives over associated PCIe links. PCIe switches of each storage sled 410 also are communicatively coupled to an on-sled processor or control system for traffic statistics retrieval and status monitoring, among other operations. PCIe switches of each storage sled 410 communicate over one or more PCIe links 440 with an associated PCIe switch fabric 421 of an I/O module 420.

PCIe switch fabric 421 comprises one or more PCIe switches which communicate over PCIe links 442 with PCIe switch fabric 432 of one or more processing modules 430. PCIe switch fabric 432 communicates with one or more associated processing systems 431 over PCIe links 436. I/O modules 420 each employ PCIe switch fabric 421 for interconnecting processor modules over PCIe links 441, such as processor modules 430. A portion of PCIe switch fabric 421 is included for this processor module cross-connect, and communicate with a PCIe switch fabric 432 in associated processing modules 430 over processor module cross-connect links 441. PCIe switch fabric 421 can also each include unit or cluster cross-connect links 443, which are used to expand the PCIe fabric to other physical unit enclosures. In the example in FIG. 4, PCIe switch fabrics 421 and 432 (and associated PCIe links) are included in a PCIe fabric of system 400, and used for carrying user data between storage sleds 410, processing modules 430, and network interfaces 444-445.

Each processing module 430 communicates over one or more PCIe links 436 through PCIe switch fabrics 421 and 432 with external expansion cards or external PCIe ports. In some examples, the external network expansion cards include network interface cards for communicating over TCP/IP (Transmission Control Protocol (TCP)/Internet Protocol) networks or for carrying iSCSI (Internet Small Computer System Interface) or NVMe (NVM Express) traffic, such as iSCSI or NVMe frames directed to one or more data storage drives of storage assembly 400. These external network links are illustrated by external network interfaces 444 coupled over PCIe links 435. External access to storage assembly 400 is provided over ones of packet network links provided by external network interfaces 444, such as for end user access to data stored on storage sleds 410. In this example, various frames or packets which contain storage transactions or storage operations for any of storage sleds 410 can be received over external network interfaces 444, such as frames 371-372. Likewise, data or response signaling associated with the storage operations can be transferred over interfaces 444 for delivery to end users.

Each processing module 430 can also communicate with other processing modules, such as those in other storage assemblies, over one or more inter-module packet network interfaces 445 coupled over PCIe links 434. In some examples, module packet network interfaces 445 include network interface cards for communicating over Ethernet or TCP/IP (Transmission Control Protocol (TCP)/Internet Protocol) networks for exchanging storage packets between processing modules.

The PCIe switches and fabrics discussed herein can comprise one or more PCIe crosspoint switches, which logically interconnect various ones of the associated PCIe links based at least on the traffic carried by each PCIe link. Each PCIe switch port can provide logical isolation between endpoints or groups of endpoints using non-transparent (NT) ports or domain-based logical isolation. An NT port can allow some logical isolation between endpoints, much like a bridge, while a transparent port does not allow logical isolation, and has the effect of connecting endpoints in a purely switched configuration. Access over an NT port or ports can include additional handshaking between the PCIe switch and the initiating endpoint to select a particular NT port or to allow visibility through the NT port. In other examples, a domain-based PCIe signaling distribution can be included which allows segregation of PCIe ports of a PCIe switch according to user-defined groups.

PCIe can support multiple bus widths, such as x1, x4, x8, x16, and x32, with each multiple of bus width comprising an additional "lane" for data transfer. PCIe also supports transfer of sideband signaling, such as System Management Bus (SMBus) interfaces and Joint Test Action Group (JTAG) interfaces, as well as associated clocks, power, and bootstrapping, among other signaling. Although PCIe is used in FIG. 4, it should be understood that different communication links or busses can instead be employed, such as NVMe, Ethernet, Serial Attached SCSI (SAS), FibreChannel, Thunderbolt, Serial Attached ATA Express (SATA Express), among other interconnect, network, and link interfaces. Any of the links in FIG. 4 can each use various communication media, such as air, space, metal, optical fiber, or some other signal propagation path, including combinations thereof. Any of the links in FIG. 4 can include any number of PCIe links or lane configurations. Any of the links in FIG. 4 can each be a direct link or might include various equipment, intermediate components, systems, and networks. Any of the links in FIG. 4 can each be a common link, shared link, aggregated link, or may be comprised of discrete, separate links.

In FIG. 4, any processing system 431 on any processing module 430 has logical visibility to all storage drives in all storage sleds 410. Any processing system 431 can transfer data for storage on any storage drive and retrieve data already stored on any storage drive. Thus, 'm' number of storage drives can be coupled with 'n' number of processors to allow for a large, scalable architecture with a high-level of redundancy and density.

To provide visibility of each processing system 431 to any storage sled 410, various techniques can be employed. In a first example, a particular processing system 431 manages (instantiates/binds) a subset number of the total quantity of storage sleds, such as 16 storage drives spanning 4 storage sleds, and handles transactions for that subset of storage drives, such as read and write transactions. Each processing system 431, however, has memory-mapped or routing-table based visibility to the storage drives managed by any other processing system 431 or processing systems in other storage assemblies. When a storage operation is desired for a storage drive not managed by a particular processing system, the particular processing system uses the memory mapped access or routing-table based visibility to direct the storage operation to the proper storage drive for that transaction. The transaction can be transferred and transitioned to the appropriate processing system that manages that storage drive associated with the data of the transaction. The PCIe fabric, namely PCIe switch fabrics 421 and 432 (or alternatively inter-module network interfaces 445), are used to transfer data between processing systems so that a particular processing system or processor can store the data in the storage sled or sleds that is managed by that particular processing system, even though the data might be received over a network interface associated with a different processing system.

In this example, the PCIe interfaces associated with each processing system 431 have 64-bit address spaces, which allows an addressable space of $2^{64}$ bytes, leading to at least 16 exibytes of byte-addressable memory. The 64-bit PCIe address space can shared by all processing systems 431 for memory mapping to storage drives on storage sleds. Thus, while each particular processing system 431 actually manages a subset of the total storage drives on storage sleds, all processors 431 have visibility to, and can initiate read/write transactions to, any of storage drives on storage sleds. A managing processing system 431 that manages a particular storage drives on storage sleds receives write/read transactions and any associated data from an initiating processing system 431 by at least using a memory-mapped address space or routing table to establish which processing module handles storage operations for a particular set of storage sleds.

In operation, such as a write operation, data can be received over portions of external network interfaces 444 by any processing system 431 of any processing module 430. For example, the write operation can be a write operation received over external network interfaces 444 from an end user employing an iSCSI protocol or NVMe protocol. The processing system that receives the write operation determines if it physically manages the storage drive or drives associated with the write operation, and if it does, then the processing system transfers the data for storage on the associated storage drives over the PCIe fabric(s). If the processing system determines that it does not physically manage the storage drive or drives associated with the write operation, then the processing system transfers the write operation to another processing module that includes the processing system that does manage the storage drive or drives over the PCIe fabric(s), over inter-module network interfaces 445, or a combination thereof. Data striping can be employed by any processing system to stripe data for a particular write transaction over any number of storage drives, such as over all of the storage sleds that include storage drives managed by the particular processing system.

Various thread-specific buffers can be employed for each context when multi-threaded interrupt schemes are employed, such as the MSI-X scheme in FIG. 3. An operating system and associated kernel can be executed on each processing system 431 of processing module 430, such as kernels 320 shown in FIG. 4. Each kernel can employ enhanced buffer pools 351-354 as well as a traditional global buffer pool 350. Frames 371-372 can be received into enhanced buffer pools 351-354 for network stack processing by an associated network driver of kernel 320. Each processing system 431 can transfer write data associated with frames 371-372 into storage sleds 410 that are managed by the associated processing system, such as data 380-384. Likewise, processing systems 431 can read data requested by any of frames 371-372 from managed ones of storage sleds 410.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A data system, comprising:
a processing system configured to execute an operating system that comprises a network module for handling data frames directed to a plurality of kernel threads and received over one or more network interfaces of the data system;
the network module configured to establish a plurality of data buffers individually associated with the kernel threads;
the network module configured to store associated ones of the data frames for the kernel threads in the data buffers as the data frames are processed through a network stack of the data system; and
the network module configured to maintain data exclusivity locks for the plurality of data buffers and individually associate the data exclusivity locks with the kernel threads.

2. The data system of claim 1, comprising:
the network module configured to manage the data exclusivity locks while the data frames progress in parallel data pathways through the network stack, with each of the parallel data pathways corresponding to an individual one of the kernel threads.

3. The data system of claim 1, comprising:
the network module configured to operate the data exclusivity locks to allow each of the kernel threads to concurrently process the data frames through the network stack without blocking across the kernel threads.

4. The data system of claim 1, wherein the kernel threads are each associated with a messaged signaling interrupt (MSI).

5. The data system of claim 4, wherein the one or more data storage drives and the processing system are coupled over a Peripheral Component Interconnect Express (PCIe) fabric.

6. The data system of claim 1, wherein the data frames comprise iSCSI (Internet Small Computer System Interface) frames directed to one or more data storage drives of a data storage system comprising the data system.

7. The network data system of claim 1, wherein the data frames comprise data storage transactions directed to one or more storage drives of a data storage system; and comprising:
the network module configured to place the data frames into selected ones of the plurality of data buffers based on a storage context of the storage transactions; and
the network module configured to handle processing of the data frames through the network stack by the kernel threads in parallel among the plurality of data buffers.

8. The network data system of claim 1, wherein the network module comprises a network driver configured to handle traffic associated with the one or more network interfaces for the processing system, and wherein the plurality of data buffers are included in the network driver and allow concurrent processing of the data frames among the kernel threads through the network stack.

9. The network data system of claim 1, comprising:
the one or more network interfaces comprising Ethernet interfaces configured to receive storage frames for storage transactions involving data storage drives of the data processing system, wherein each of the kernel threads is associated with a different storage context;
responsive to receiving the storage frames over the Ethernet interfaces, the network module configured to place the storage frames into the data buffers according to an associated storage context and allow the kernel threads to concurrently process the storage frames through the network stack without ones of the kernel threads blocking access to the data buffers across the storage contexts.

10. A method comprising:
executing an operating system that comprises a network module for handling data frames received over one or more network interfaces of a data system, the data frames directed to one or more kernel threads;
in the network module, establishing a plurality of data buffers individually associated with the one or more kernel threads;
in the network module, storing associated ones of the data frames for the one or more kernel threads in the data buffers as the data frames are processed through a network stack of the data system; and
in the network module, maintaining data exclusivity locks for the plurality of data buffers and individually associating the data exclusivity locks with the one or more kernel threads.

11. The method of claim 10, further comprising:
in the network module, managing the data exclusivity locks while the data frames progress in parallel data pathways through the network stack, with each of the parallel data pathways corresponding to an individual kernel thread.

12. The method of claim 10, further comprising:
in the network module, operating the data exclusivity locks to allow each of the application threads to concurrently process the data frames through the network stack without blocking across the one or more kernel threads.

13. The method of claim 10, wherein the one or more kernel threads are each associated with a messaged signaling interrupt (MSI).

14. The method of claim 13, wherein the one or more data storage drives and the processing system are coupled over a Peripheral Component Interconnect Express (PCIe) fabric.

15. The method of claim 10, wherein the data frames comprise iSCSI (Internet Small Computer System Interface) frames directed to one or more data storage drives of a data storage system comprising the data system.

16. The method of claim 10, wherein the data frames comprise data storage transactions directed to one or more storage drives of a data storage system; and further comprising:
in the network module, placing the data frames into selected ones of the plurality of data buffers based on a storage context of the storage transactions; and
in the network module, handling processing of the data frames through the network stack by the one or more kernel threads in parallel among the plurality of data buffers.

17. The method of claim 10, wherein the network module comprises a network driver configured to handle traffic associated with the one or more network interfaces for the processing system, and wherein the plurality of data buffers are included in the network driver and allow concurrent processing of the data frames among the one or more kernel threads through the network stack.

18. The method of claim 10, wherein the one or more network interfaces comprise Ethernet interfaces, and further comprising:
in the Ethernet interfaces, receiving storage frames for storage transactions involving data storage drives of the data system, wherein each of the one or more kernel threads is associated with a different storage context;
responsive to receiving the storage frames over the Ethernet interfaces, in the network module, placing the storage frames into the data buffers according to an associated storage context and allowing the application threads to concurrently process the storage frames through the network stack without ones of the one or more kernel threads blocking access to the data buffers across the storage contexts.

19. A computing system, comprising:
a processor configured to execute an operating system that comprises a network stack for handling storage frames that are received into the network stack over one or more network interfaces, the storage frames comprising storage operations directed to one or more storage drives; and
the network stack configured to:
establish a plurality of data buffers individually associated with kernel threads executed by the processor;
store associated ones of the storage frames for the kernel threads in the data buffers as the storage frames are processed through the network stack; and
maintain data exclusivity locks for the plurality of data buffers and individually associate the data exclusivity locks with the kernel threads.

20. The computing system of claim 19, comprising:
the network stack configured to manage the data exclusivity locks while the storage frames progress in parallel data pathways through the network stack, with each of the parallel data pathways corresponding to an individual one of the kernel threads; and
the network stack configured to operate the data exclusivity locks to allow each of the kernel threads to concurrently process the storage frames through the network stack without blocking across the kernel threads.

* * * * *